(12) United States Patent
Soria et al.

(10) Patent No.: US 11,174,815 B2
(45) Date of Patent: Nov. 16, 2021

(54) INLET DEEP CAVITY FLUTTER LINER (71) Applicant: Rohr, Inc., Chula Vista, CA (US)

(72) Inventors: Christian Soria, La Mesa, CA (US); Wentaur Eugene Chien, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 561 days.

(21) Appl. No.: 16/132,225

(22) Filed: Sep. 14, 2018

(65) Prior Publication Data
US 2020/0088136 A1 Mar. 19, 2020

(51) Int. Cl.
*F02K 1/82* (2006.01)
*B64D 29/00* (2006.01)
*B64D 33/02* (2006.01)
*F02C 7/045* (2006.01)

(52) U.S. Cl.
CPC .............. *F02K 1/827* (2013.01); *B64D 29/00* (2013.01); *B64D 33/02* (2013.01); *F02C 7/045* (2013.01); *B64D 2033/0206* (2013.01); *F05D 2260/96* (2013.01)

(58) Field of Classification Search
CPC ......... F02K 1/827; F02C 7/045; B64D 29/00; B64D 33/02
USPC .......................................................... 181/213
See application file for complete search history.

(56) References Cited

U.S. PATENT DOCUMENTS

| 5,498,127 | A * | 3/1996 | Kraft | F02C 7/045 415/119 |
| 7,766,280 | B2 * | 8/2010 | Cloft | F02K 3/06 244/208 |
| 9,500,131 | B2 | 11/2016 | Richter | |
| 9,546,602 | B2 | 1/2017 | Julliard et al. | |
| 9,732,677 | B1 | 8/2017 | Chien et al. | |
| 9,764,818 | B2 | 9/2017 | Nampy et al. | |
| 2010/0236862 | A1 * | 9/2010 | Stemberger | F02C 7/045 181/213 |
| 2018/0148187 | A1 | 5/2018 | Valleroy et al. | |

(Continued)

FOREIGN PATENT DOCUMENTS

EP 3244038 11/2017

OTHER PUBLICATIONS

European Patent Office, European Search Report dated Dec. 5, 2019 in Application No. 19197406.2.

*Primary Examiner* — Forrest M Phillips
(74) *Attorney, Agent, or Firm* — Snell & Wilmer L.L.P.

(57) ABSTRACT

A nacelle inlet may comprise an aft bulkhead, an attachment ring extending in an aft direction from the aft bulkhead, an acoustic liner disposed radially inward from the attachment ring, the acoustic liner comprising a proximal skin, a distal skin, and a core disposed between the proximal skin and the distal skin, and a shroud extending longitudinally between a forward side of the shroud and an aft side of the shroud and extending circumferentially between a first end of the shroud and a second end of the shroud, wherein the shroud defines a plenum disposed between the acoustic liner and the shroud, the plenum is in fluid communication with the core via perforations in the distal skin. The plenum may serve to attenuate low frequency noise known as "buzz saw" tones and/or alleviate pressure resonance conditions that may cause structural damage to the engine fan blades.

18 Claims, 6 Drawing Sheets

(56) References Cited

U.S. PATENT DOCUMENTS

2018/0258788 A1* 9/2018 Morin .................. F02C 7/045
2019/0161199 A1* 5/2019 Lacko .................. B64D 33/06

* cited by examiner

```
Coupling a shroud to an acoustic liner    710
                    ↓
Coupling the shroud to an attachment ring    720
```

FIG. 7

INLET DEEP CAVITY FLUTTER LINER

FIELD

The present disclosure relates to a sound-absorbing arrangement for an engine nacelle and an engine nacelle comprising such an arrangement.

BACKGROUND

In modern aircraft engines a fan is used to create a thrust, with the fan being driven by a core engine. The fan is a major source of low-frequency engine noise, sometimes referred to as a "buzz saw" tone during aircraft takeoff and climb conditions, in the area in front of the engine, which may impact the comfort in the cabin in a negative way. In addition, coupled aeroelastic vibrations may occur as the mechanical vibrations of the fan blades and the flow surrounding them goes into resonance with the acoustic field that is formed around the fan.

SUMMARY

A nacelle inlet is disclosed, comprising an aft bulkhead, an attachment ring extending in an aft direction from the aft bulkhead, an acoustic liner disposed radially inward from the attachment ring, the acoustic liner comprising a proximal skin, a distal skin, and a core disposed between the proximal skin and the distal skin, and a shroud extending longitudinally between a forward side of the shroud and an aft side of the shroud and extending circumferentially between a first end of the shroud and a second end of the shroud, wherein the shroud defines a plenum disposed between the acoustic liner and the shroud, the plenum in fluid communication with the core via perforations in the distal skin.

In various embodiments, the plenum is at least partially defined by the attachment ring.

In various embodiments, the shroud comprises a longitudinal wall and a vertical wall.

In various embodiments, the shroud is bonded to at least one of the acoustic liner and the attachment ring.

In various embodiments, the shroud is coupled to at least one of the acoustic liner and the attachment ring via a plurality of fasteners.

In various embodiments, the attachment ring is configured to attach the nacelle inlet to a fan case.

In various embodiments, the first end of the shroud is coupled to an adjacent shroud.

In various embodiments, the shroud is coupled to the acoustic liner at the forward side of the shroud and the shroud is coupled to the attachment ring at the aft side of the shroud.

A nacelle for a gas turbine engine is disclosed, comprising an inlet comprising an attachment ring, an acoustic liner, and a shroud extending longitudinally between a forward side of the shroud and an aft side of the shroud and extending circumferentially between a first end of the shroud and a second end of the shroud, and a fan case disposed aft of the inlet, wherein the acoustic liner is disposed radially inward from the attachment ring, the acoustic liner comprising a proximal skin, a distal skin, and a core disposed between the proximal skin and the distal skin, the shroud defines a plenum disposed between the acoustic liner and the shroud, the plenum in fluid communication with the core via perforations in the distal skin, and the inlet is coupled to the fan case via the attachment ring.

In various embodiments, the inlet further comprises an aft bulkhead, wherein the attachment ring extends in an aft direction from the aft bulkhead.

In various embodiments, the plenum is at least partially defined by the attachment ring.

In various embodiments, the shroud comprises a longitudinal wall and a vertical wall.

In various embodiments, the shroud is bonded to at least one of the acoustic liner and the attachment ring.

In various embodiments, the shroud is coupled to at least one of the acoustic liner and the attachment ring via a plurality of fasteners.

In various embodiments, the first end of the shroud is coupled to an adjacent shroud.

In various embodiments, the shroud is coupled to the acoustic liner at the forward side of the shroud and the shroud is coupled to the attachment ring at the aft side of the shroud.

A method for manufacturing a nacelle inlet is disclosed, comprising coupling a shroud to an acoustic liner, and coupling the shroud to an attachment ring, wherein a plenum is formed between at least the shroud and the acoustic liner in response to coupling the shroud to the acoustic liner and the attachment ring, the plenum is fluid communication with a core of the acoustic liner.

In various embodiments, the shroud is coupled to the acoustic liner along a forward side of the shroud and the shroud is coupled to the attachment ring along an aft side of the shroud.

In various embodiments, coupling the shroud to the attachment ring includes coupling the shroud to a flange of the attachment ring.

In various embodiments, the method further comprises coupling the acoustic liner to the attachment ring, and coupling an aft bulkhead to the attachment ring.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

As used herein, "outboard" may define an element or portion of an element that is situated radially outer to or away from another, radially inward, element or portion of an element. Thus, an engine core may be situated radially inboard of an inner fixed structure ("IFS") and/or a fan casing, as described herein. As used herein, "inboard" may define the element or portion of the element that is situated radially inward in relation to an outboard element.

A shroud, as disclosed herein, may partially define a backside plenum for an acoustic liner. A shroud, as disclosed herein, may provide a low weight and low cost solution for engine noise attenuation. A shroud, as disclosed herein, may be easily configurable for various inlet designs. A shroud, as disclosed herein, may provide ease of installation.

Figure 1:
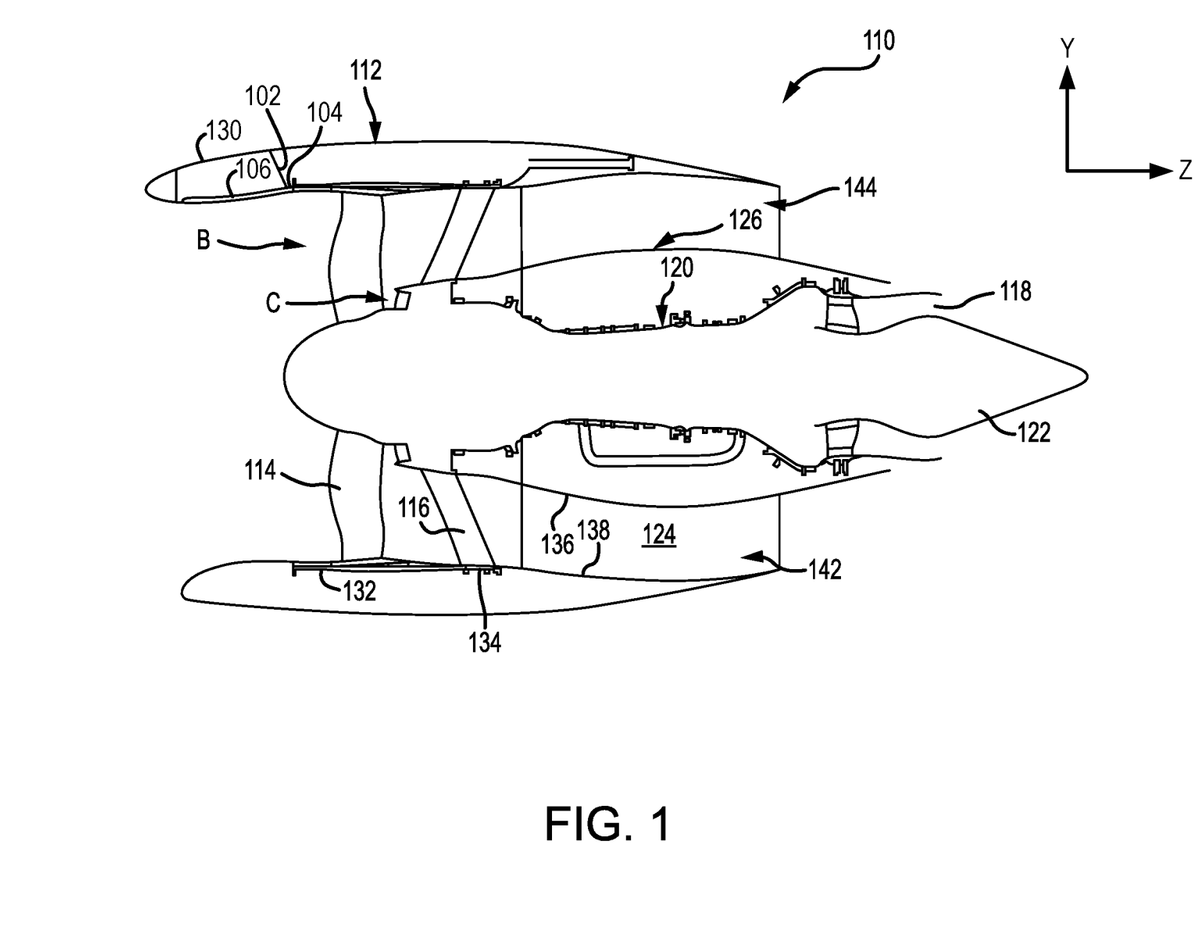
FIG. 1 illustrates a schematic view of a gas turbine engine, in accordance with various embodiments.

According to various embodiments, FIG. 1 illustrates a schematic sectional view of a gas turbine engine. Gas turbine engine 110 may include core engine 120. Core air flow C flows through core engine 120 and is expelled through exhaust outlet 118 surrounding exhaust centerbody 122.

Core engine 120 drives a fan 114 arranged in a bypass flow path 124. Bypass air flow B, driven by the fan 114, flows in the aft direction through bypass flow path 124. At least a portion of bypass flow path 124 may be defined by nacelle structure 112 and inner fixed structure (IFS) 126. As is known, the general shape of IFS 126 is a surface of revolution around the engine axis, often with two bifurcation panels at the six o'clock and the twelve o'clock position which extend radially outward, and the IFS is often made from two generally mirror image halves that hinge together as part of the thrust reverser structure. The radially-outboard surface of IFS 126 may be referred to as an inner flow surface 136 of the bypass flow path 124, and the radially-inboard surface of nacelle structure 112 may be referred to as an outer flow surface 138 of the bypass flow path 124. Fan case 132 may surround fan 114. Fan case 132 may be housed within nacelle structure 112.

In various embodiments, an intermediate case (IMC) 134 of the gas turbine engine 110 may be provided radially inward of fan case 132. Fan case 132 may provide mounting structure for securing gas turbine engine 110 to a pylon. IMC 134 may be surrounded by nacelle structure 112. According to various embodiments, multiple guide vanes 116 may extend radially between fan case 132 and IMC 134. Core engine 120 may be secured to fan case 132 at IMC 134.

In various embodiments, a nacelle inlet 130 of the nacelle structure 112 may be provided axially forward of the fan case 132. Nacelle inlet 130 may comprise an aft bulkhead 102 and an attachment ring 104 coupled to the aft bulkhead 102 whereby nacelle inlet 130 is coupled to fan case 132. An acoustic liner 106 may be coupled to attachment ring 104. Acoustic liner 106 may at least partially define bypass flow path B.

Figure 2:
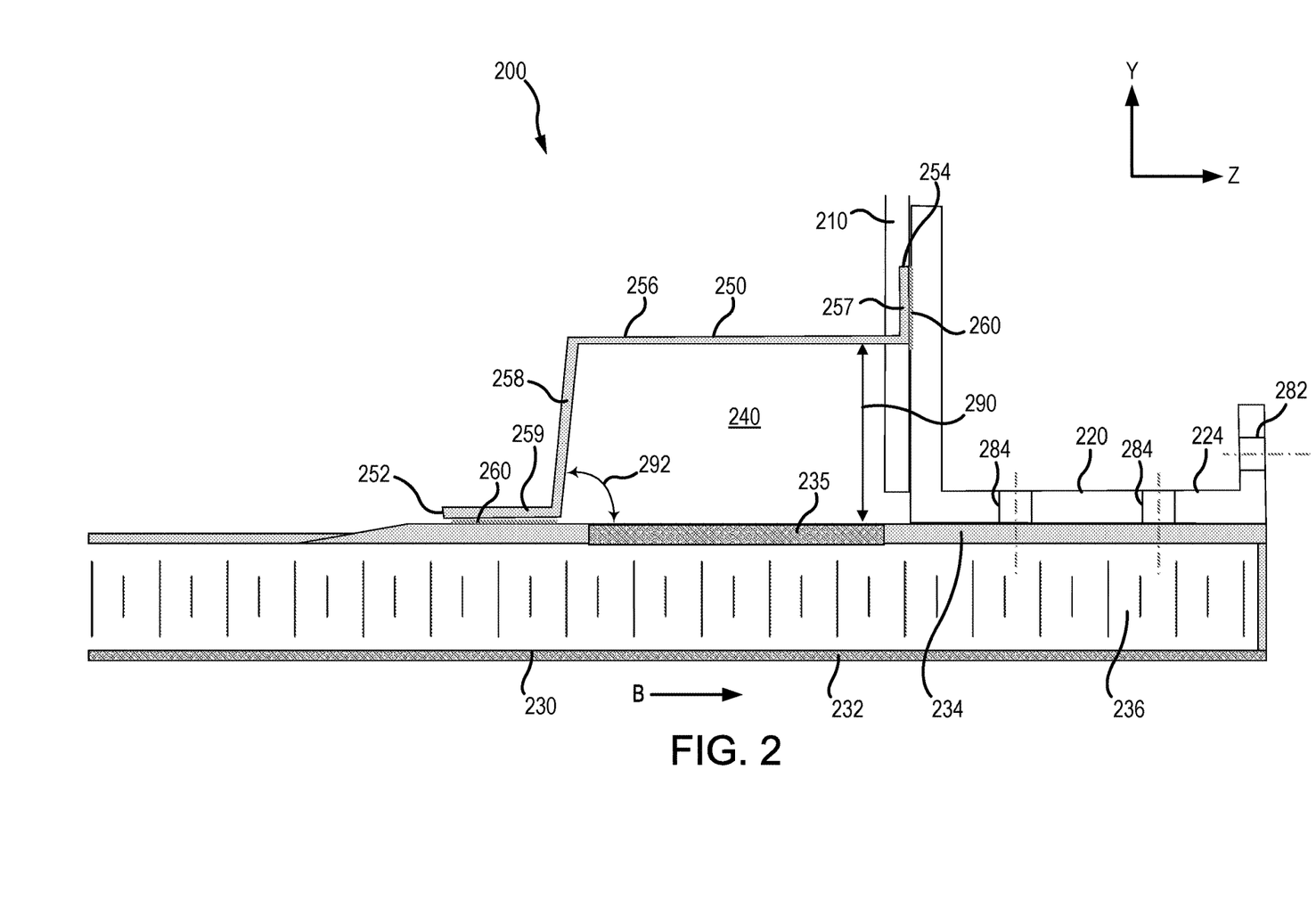
FIG. 2 illustrates a cross-sectional view of a nacelle inlet comprising a shroud defining a backside plenum for a single degree of freedom (SDOF) acoustic liner, in accordance with various embodiments.

According to various embodiments, FIG. 2 illustrates a sectional view of a nacelle inlet 200, in accordance with various embodiments. In various embodiments, nacelle inlet 200 is similar to nacelle inlet 130 of FIG. 1. Nacelle inlet 200 may comprise an aft bulkhead 210 and an attachment ring 220 coupled to the aft bulkhead 210. In various embodiments, attachment ring 220 may be attached to aft bulkhead 210 via a plurality of attachment features, such as bolts, rivets, or the like. Attachment ring 220 may be configured for coupling nacelle inlet 200 to an adjacent fan case. In various embodiments, attachment ring 220 may comprise a first plurality of apertures 282 disposed therein whereby a plurality of fasteners—e.g., bolts—may secure attachment ring 220 to a fan case. In this regard, attachment ring 220 may be configured to attach nacelle inlet 200 to a fan case. Attachment ring 220 may be made from a metal or metal alloy material.

In various embodiments, nacelle inlet 200 comprises an acoustic liner 230. Acoustic liner 230 may be coupled to attachment ring 220. Attachment ring 220 may comprise a second plurality of apertures 284 disposed therein whereby a plurality of fasteners—e.g., bolts, rivets, or the like may secure acoustic liner 230 to attachment ring 220. Mechanical loads may be transferred between acoustic liner 230 and attachment ring 220, via the plurality of fasteners at second plurality of apertures 284. Acoustic liner 230 may comprise a permeable proximal skin 232, a mostly non-permeable distal skin 234 (except for perforations 235), and a core 236 disposed there between. Acoustic liner 230 may be a single degree of freedom (SDOF) acoustic liner.

In various embodiments, nacelle inlet 200 comprises a shroud 250 defining a plenum 240 disposed between the shroud 250 and the acoustic liner 230. Plenum 240 may be partially defined by attachment ring 220, in accordance with various embodiments. Plenum 240 may be partially defined by aft bulkhead 210, in accordance with various embodiments. Plenum 240 is in fluid communication with core 236 and bypass flow path B via perforations 235 disposed in the distal skin 234. Shroud 250 may extend longitudinally (i.e., in the Z-direction) between a forward side 252 of the shroud 250 and an aft side 254 of the shroud 250. Plenum 240 may be formed between shroud 250, acoustic liner 230, and/or attachment ring 220 in response the shroud 250 being coupled to acoustic liner 230 and attachment ring 220. Forward side 252 may be coupled to distal skin 234. Aft side 254 may be coupled to attachment ring 220. In various embodiments, forward side 252 is bonded to distal skin 234 via an adhesive 260, such as a glue or resin. In various embodiments, aft side 254 is bonded to attachment ring 220 via an adhesive 260. In this manner, shroud 250 may be configured as a non-structural component. Stated differently, mechanical loads are transferred between acoustic liner 230 and attachment ring 220 at longitudinally extending portion 224 of attachment ring 220, whereas shroud 250 is configured such that minimal to no mechanical loads are transferred between acoustic liner 230 and attachment ring 220 via shroud 250. In this manner, shroud 250 may be configured as a thin, lightweight shroud, reducing overall nacelle weight and increasing design flexibility of the shroud 250.

In various embodiments, shroud 250 may be made from a composite material, such as a carbon fiber reinforced polymer, among others. Shroud 250 may be cured using a resin in a carbon fiber layup process, among others. In various embodiments, shroud 250 may be made from a metal, such as aluminum, among others. Shroud 250 may be formed using hydroforming, casting, additive manufacturing, negative manufacturing, and/or pressing processes, among others. Shroud 250 may comprise a thermoplastic material, such as an acrylic or a polycarbonate, among others. Shroud 250 may be formed using injection molding, compression molding, or extrusion, among others.

In various embodiments, shroud 250 may comprise a longitudinal wall 256 and a vertical wall 258. In various embodiments, longitudinal wall 256 may be substantially parallel with respect to distal skin 234. In various embodiments, vertical wall 258 may extend between longitudinal wall 256 and distal skin 234. Vertical wall 258 may be oriented at an angle 292 of between thirty degrees and one hundred and twenty degrees (30°-120°), and in various embodiments, at an angle 292 of between forty-five degrees and one hundred degrees (45°-100°), and in various embodiments, at an angle 292 of between sixty degrees and ninety degrees (60°-90°). Because shroud 450 is a non-load bearing shroud, the orientation of vertical wall 258 is not particularly limited and may be designed according to the design of the nacelle inlet 200 and depending on the location of adjacent components. For example, the angle 292 may vary around the circumference of the shroud 250 to accommodate for components located within the nacelle inlet.

In various embodiments, the height of shroud 250 (i.e., the distance between longitudinal wall 256 of shroud 250 and distal skin 234 measured in the Y-direction (also referred to herein as a radial direction)) may be varied according to the desired acoustic properties of plenum 240, as well as in order to route shroud 250 around adjacent components within nacelle inlet 200. For acoustic attenuating performance it may be desirable that the cross sectional area of plenum 240 be maintained constant at every circumferential slice of plenum 240 and being able to adjust the height 290 of plenum 240 in combination with the longitudinal placement (i.e., in the Z-direction) and angle 292 of vertical wall 258 may be advantageous. For example, in areas where the height 290 may be limited, the longitudinal placement of vertical wall 258 may be moved forward (i.e., negative Z-direction) to maintain a constant cross-sectional area of plenum 240 at every circumferential location.

In various embodiments, shroud 250 may comprise a first tab 257 at aft side 254 whereby shroud 250 is coupled to attachment ring 220. In various embodiments, shroud 250 may comprise a second tab 259 at forward side 252 whereby shroud 250 is coupled to distal skin 234.

Figure 3:
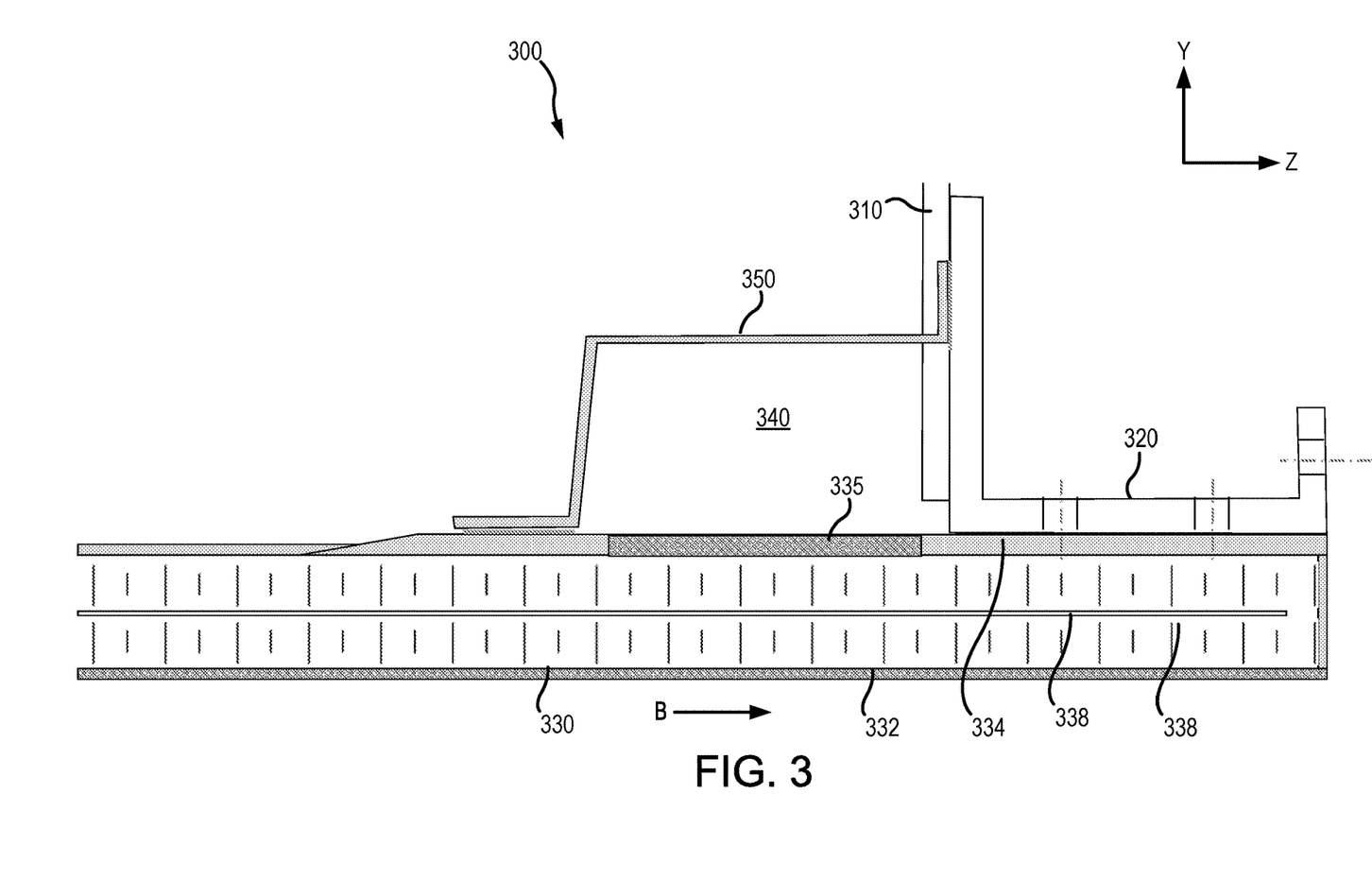
FIG. 3 illustrates a cross-sectional view of a nacelle inlet comprising a shroud defining a backside plenum for a double degree of freedom (DDOF) acoustic liner, in accordance with various embodiments.

Referring to FIG. 3, a nacelle inlet 300 is illustrated, in accordance with various embodiments. Nacelle inlet 300 may be similar to nacelle inlet 200 of FIG. 2, except that nacelle inlet 300 comprises a double degree of freedom (DDOF) acoustic liner 330, as opposed to the SDOF acoustic liner 230 of FIG. 2. Acoustic liner 330 may have a permeable septum 338 dividing a core 336 into two chambers. Acoustic liner 330 may comprise a permeable proximal skin 332, a mostly non-permeable distal skin 334 (except for perforations 335), and core 336 disposed there between. Nacelle inlet 300 may comprise a shroud 350. Shroud 350 may be similar to shroud 250 of FIG. 2. Nacelle inlet 300 may comprise an aft bulkhead 310. Aft bulkhead 310 may be similar to aft bulkhead 210 of FIG. 2. Nacelle inlet 300 may comprise an attachment ring 320. Attachment ring 320 may be similar to attachment ring 220 of FIG. 2.

Figure 4:
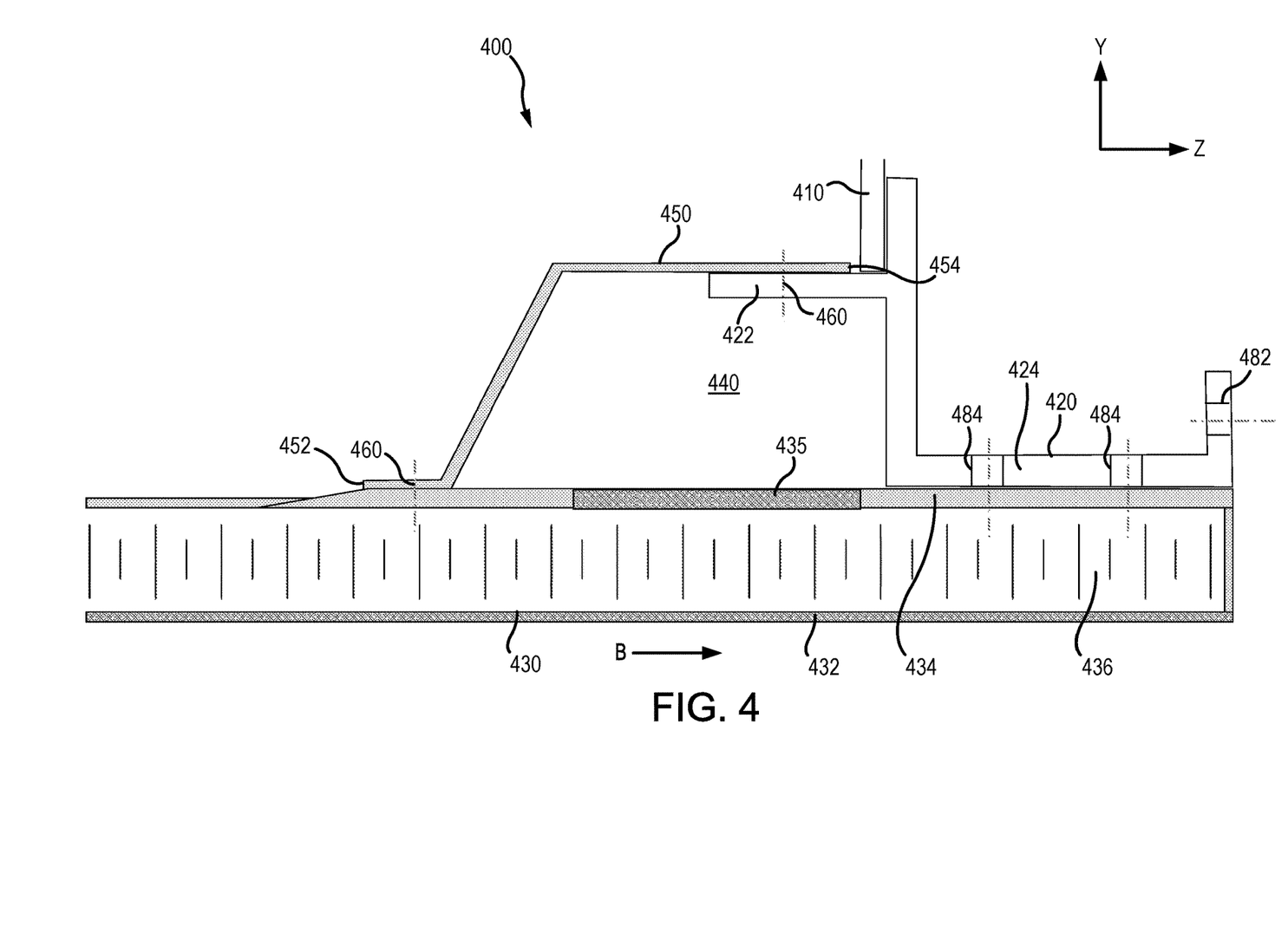
FIG. 4 illustrates a cross-sectional view of a nacelle inlet comprising a shroud coupled to an attachment ring flange and defining a backside plenum for an SDOF acoustic liner, in accordance with various embodiments.

According to various embodiments, FIG. 4 illustrates a sectional view of a nacelle inlet 400, in accordance with various embodiments. Nacelle inlet 400 may be similar to nacelle inlet 200 except that an attachment ring 420 of nacelle inlet 400 includes a forward extending flange 422 for attaching the shroud 450 to the attachment ring 420. Flange 422 may extend in the forward direction (i.e., the negative Z-direction) from attachment ring 420. In various embodiments, flange 422 may be formed monolithically with attachment ring 420. By providing flange 422, aft side 454 of shroud 450 may be attached to attachment ring 420 without interfering with aft bulkhead 410 or other related components disposed at aft bulkhead 410, such as stiffeners for example. In this manner, shroud 450 may be manufactured having a continuous aft side 454, without having to form cut-outs therein to accommodate for adjacent components.

Nacelle inlet 400 may comprise an aft bulkhead 410. In various embodiments, the attachment ring 420 is coupled to the aft bulkhead 410. Attachment ring 420 may be configured for coupling nacelle inlet 400 to an adjacent fan case. In various embodiments, attachment ring 420 may comprise a first plurality of apertures 482 disposed therein whereby a plurality of fasteners—e.g., bolts—may secure attachment ring 420 to a fan case.

In various embodiments, nacelle inlet 400 comprises an acoustic liner 430. Acoustic liner 430 may be coupled to attachment ring 420. Attachment ring 420 may comprise a second plurality of apertures 484 disposed therein whereby a plurality of fasteners—e.g., bolts, rivets, or the like—may secure acoustic liner 430 to attachment ring 420. Mechanical loads may be transferred between acoustic liner 430 and attachment ring 420, via the plurality of fasteners at second plurality of apertures 484. Acoustic liner 430 may comprise a permeable proximal skin 432, a mostly non-permeable distal skin 434 (except for perforations 435), and a core 436 disposed there between. Acoustic liner 430 may be an SDOF acoustic liner.

In various embodiments, at side 454 of shroud 450 may be coupled to flange 422 via a plurality of fasteners 460, such as rivets for example. Forward side 452 of shroud 450 may be coupled to distal skin 234 via a plurality of fasteners 460, such as rivets for example. Shroud 450 may be configured as a non-load bearing component. Stated differently, mechanical loads are transferred between acoustic liner 230 and attachment ring 420 at longitudinally extending portion 424 of attachment ring 420, whereas shroud 250 is configured such that minimal to no mechanical loads are transferred between acoustic liner 230 and flange 422 via shroud 250. In this manner, shroud 250 may be configured as a thin, lightweight shroud, reducing overall nacelle weight and increasing design flexibility and of the shroud 250.

In various embodiments, shroud 450 may define a plenum 440 disposed between the shroud 450 and the acoustic liner 430. Plenum 440 may be partially defined by attachment ring 420, in accordance with various embodiments. Plenum 440 may be partially defined by flange 422, in accordance with various embodiments. Plenum 440 is in fluid communication with core 436 and bypass flow path B via perforations 435 disposed in the distal skin 434. Shroud 450 may extend longitudinally (i.e., in the Z-direction) between a forward side 452 and aft side 454. Forward side 452 may be coupled to distal skin 434. In various embodiments, aft side 454 may be bonded to flange 422 via an adhesive. In various embodiments, forward side 452 may be bonded to distal skin 434 via an adhesive, such as a glue or resin.

Figure 5:
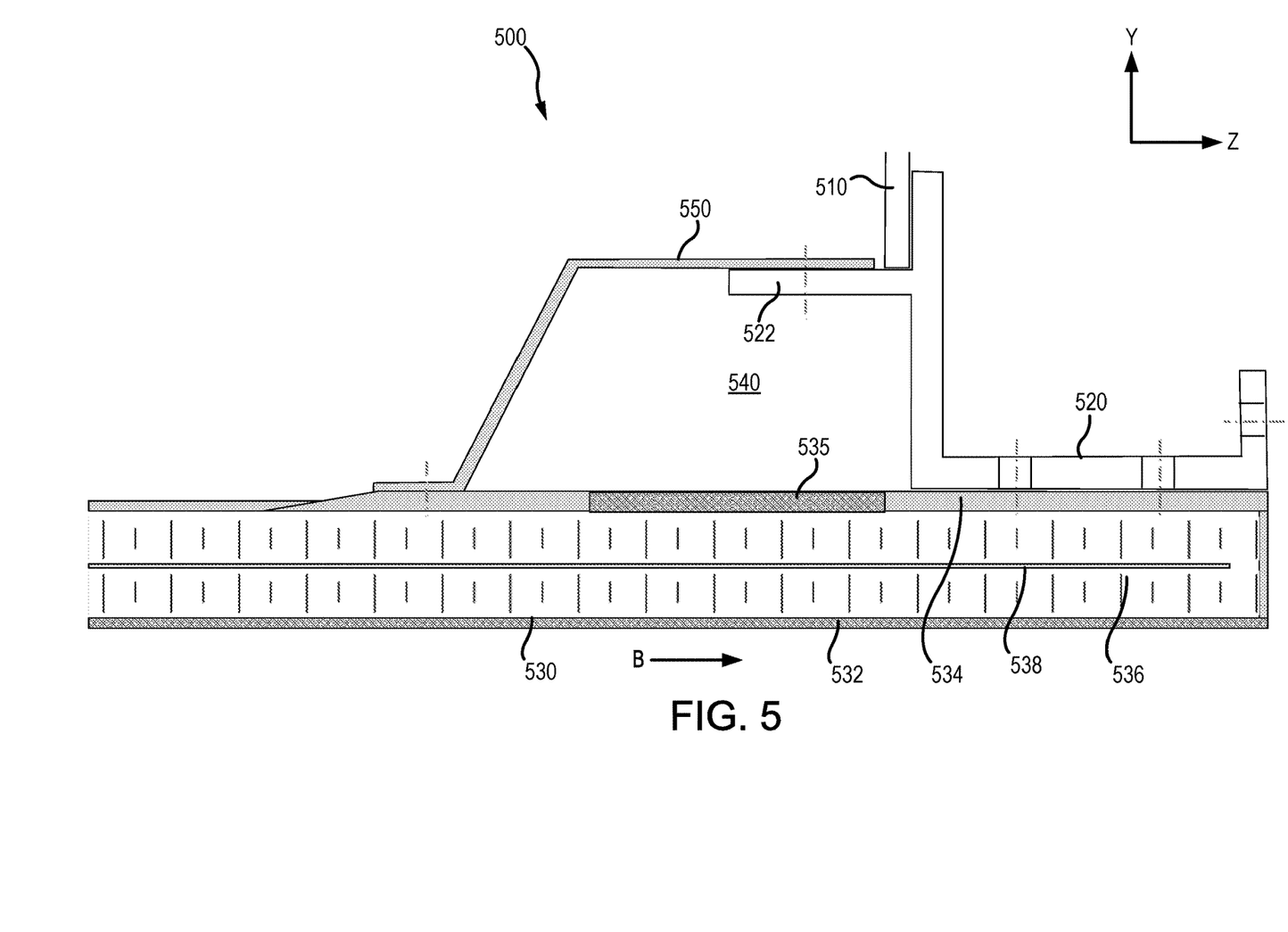
FIG. 5 illustrates a cross-sectional view of a nacelle inlet comprising a shroud coupled to an attachment ring flange and defining a backside plenum for a DDOF acoustic liner, in accordance with various embodiments.

Referring to FIG. 5, a nacelle inlet 500 is illustrated, in accordance with various embodiments. Nacelle inlet 500 may be similar to nacelle inlet 400 of FIG. 4, except that nacelle inlet 500 comprises a DDOF acoustic liner 530, as opposed to the SDOF acoustic liner 430 of FIG. 2. Acoustic liner 530 may have a permeable septum 538 dividing a core 536 into two chambers. Acoustic liner 530 may comprise a permeable proximal skin 532, a mostly non-permeable distal skin 534 (except for perforations 535), and core 536 disposed there between. Nacelle inlet 500 may comprise a shroud 550. Fairing 550 may be similar to shroud 450 of FIG. 4. Nacelle inlet 500 may comprise an all bulkhead 510. Aft bulkhead 510 may be similar to aft bulkhead 410 of FIG. 4. Nacelle inlet 500 may comprise an attachment ring 520 comprising a forward extending flange 522. Attachment ring 520 may be similar to attachment ring 420 of FIG. 4.

Figure 6:
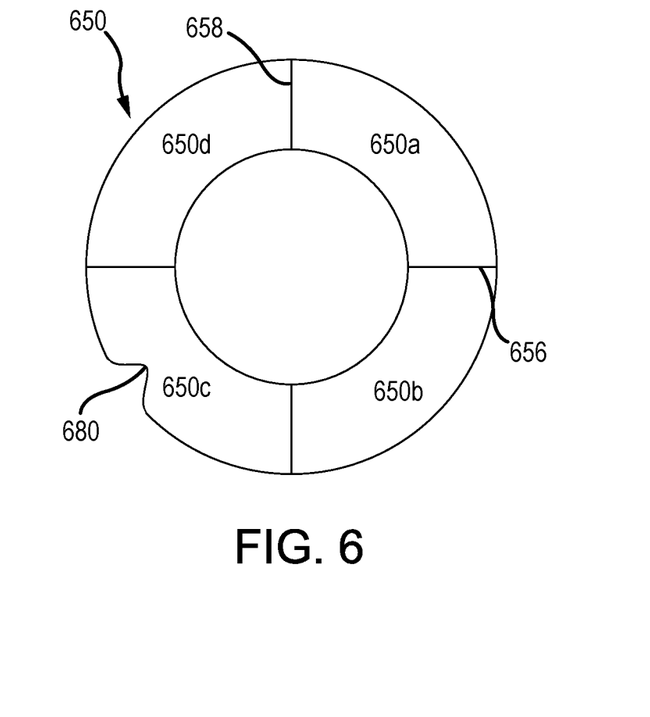
FIG. 6 illustrates a perspective view of a shroud, looking axially, the shroud comprising plurality of segments and a segment comprising a depression to accommodate for adjacent components, in accordance with various embodiments.

Referring to FIG. 6, a perspective view of a shroud 650, looking axially, is illustrated, in accordance with various embodiments. Shroud 650 may be a segmented ring. In various embodiments, shroud 650 may comprise a first shroud segment 650a, a second shroud segment 650b, a third shroud segment 650c, and a fourth shroud segment 650d. Each shroud segment may be coupled at its respective ends to an adjacent shroud segment. In this regard, shroud segment 650a may extend circumferentially between a first end 656 of the shroud segment 650a and a second end 658 of the shroud segment 650a. First end 656 may be coupled to a respective end of shroud segment 650b and second end 658 may be coupled to a respective end of shroud segment 650d. In this manner, the shroud segments 650a, 650b, 650c, and 650d may form shroud 650. Forming shroud 650 as segments may increase ease of installation as well as increase ease of manufacturing. Further, each shroud segment may comprise unique shapes formed therein for routing the shroud around adjacent components. In various embodiments, shroud segments 650c may comprise a depression 680 formed therein to allow for a component, such as a duct for example, to be routed through the nacelle inlet, in accordance with various embodiments.

Figure 7:
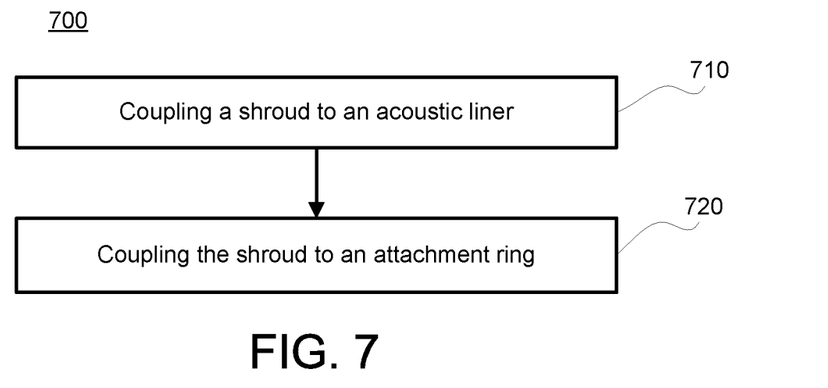
FIG. 7 illustrates a flow chart of a method for manufacturing a nacelle inlet, in accordance with various embodiments.

With reference to FIG. 7, a flow chart of a method 700 for manufacturing a nacelle inlet is illustrated, in accordance with various embodiments. Method 700 includes coupling a shroud to an acoustic liner (step 710). Method 700 includes coupling the shroud to an attachment ring (step 720).

With combined reference to FIG. 2 and FIG. 7, step 710 may include coupling shroud 250 to acoustic liner 230. Step 710 may include coupling shroud 250 to acoustic liner 230 at forward side 252. Step 720 may include coupling shroud 250 to attachment ring 220. Step 720 may include coupling shroud 250 to attachment ring 220 at aft side 254. In various embodiments, method 700 further includes coupling acoustic liner 230 to attachment ring 220. In various embodiments, method 700 further includes coupling aft bulkhead 210 to attachment ring 220.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does

We claim:

1. A nacelle inlet, comprising:
    an aft bulkhead;
    an attachment ring extending in an aft direction from the aft bulkhead;
    an acoustic liner disposed radially inward from the attachment ring, the acoustic liner comprising a proximal skin, a distal skin, and a core disposed between the proximal skin and the distal skin; and
    a shroud extending longitudinally between a forward side of the shroud and an aft side of the shroud and extending circumferentially between a first end of the shroud and a second end of the shroud;
    wherein the shroud defines a plenum disposed between the acoustic liner and the shroud, the plenum in fluid communication with the core via perforations in the distal skin,
    wherein the plenum is at least partially defined by the attachment ring.

2. The nacelle inlet of claim 1, wherein a boundary of the plenum is defined by the shroud, the acoustic liner, and the attachment ring.

3. The nacelle inlet of claim 1, wherein the shroud comprises a longitudinal wall and a vertical wall.

4. The nacelle inlet of claim 1, wherein the shroud is bonded to at least one of the acoustic liner and the attachment ring.

5. The nacelle inlet of claim 1, wherein the shroud is coupled to at least one of the acoustic liner and the attachment ring via a plurality of fasteners.

6. The nacelle inlet of claim 1, wherein the attachment ring is configured to attach the nacelle inlet to a fan case.

7. The nacelle inlet of claim 1, wherein the first end of the shroud is coupled to an adjacent shroud.

8. The nacelle inlet of claim 1, wherein the shroud is coupled to the acoustic liner at the forward side of the shroud and the shroud is coupled to the attachment ring at the aft side of the shroud.

9. A gas turbine engine nacelle, comprising:
    an inlet comprising an attachment ring, an acoustic liner, and a shroud extending longitudinally between a forward side of the shroud and an aft side of the shroud and extending circumferentially between a first end of the shroud and a second end of the shroud; and
    a fan case disposed aft of the inlet;
    wherein the acoustic liner is disposed radially inward from the attachment ring, the acoustic liner comprising a proximal skin, a distal skin, and a core disposed between the proximal skin and the distal skin,
    the shroud defines a plenum disposed between the acoustic liner and the shroud, the plenum in fluid communication with the core via perforations in the distal skin, and
    the inlet is coupled to the fan case via the attachment ring,
    wherein the plenum is at least partially defined by the attachment ring.

10. The gas turbine engine nacelle of claim 9, wherein the inlet further comprises an aft bulkhead, wherein the attachment ring extends in an aft direction from the aft bulkhead.

11. The gas turbine engine nacelle of claim 9, wherein the shroud comprises a longitudinal wall and a vertical wall.

12. The gas turbine engine nacelle of claim 9, wherein the shroud is bonded to at least one of the acoustic liner and the attachment ring.

13. The gas turbine engine nacelle of claim 9, wherein the shroud is coupled to at least one of the acoustic liner and the attachment ring via a plurality of fasteners.

14. The gas turbine engine nacelle of claim 9, wherein the first end of the shroud is coupled to an adjacent shroud.

15. The gas turbine engine nacelle of claim 9, wherein the shroud is coupled to the acoustic liner at the forward side of the shroud and the shroud is coupled to the attachment ring at the aft side of the shroud.

16. A method for manufacturing a nacelle inlet, comprising:
    coupling a shroud to an acoustic liner;
    coupling the shroud to an attachment ring,
    wherein a plenum is formed between at least the shroud and the acoustic liner in response to coupling the shroud to the acoustic liner and the attachment ring, the plenum is fluid communication with a core of the acoustic liner, and is at least partially defined by the attachment ring;
    coupling the acoustic liner to the attachment ring; and
    coupling an aft bulkhead to the attachment ring.

17. The method of claim 16, wherein the shroud is coupled to the acoustic liner along a forward side of the shroud and the shroud is coupled to the attachment ring along an aft side of the shroud.

18. The method of claim 17, wherein coupling the shroud to the attachment ring includes coupling the shroud to a flange of the attachment ring.

* * * * *